(12) United States Patent
Sugano et al.

(10) Patent No.: US 8,571,380 B2
(45) Date of Patent: Oct. 29, 2013

(54) OBJECT IMAGE DISPLAY APPARATUS, OBJECT IMAGE DISPLAY METHOD AND OBJECT IMAGE DISPLAY PROGRAM

(75) Inventors: Masato Sugano, Yokosuka (JP); Masato Horiuchi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 13/518,676

(22) PCT Filed: Oct. 12, 2010

(86) PCT No.: PCT/JP2010/067828
§ 371 (c)(1),
(2), (4) Date: Jun. 22, 2012

(87) PCT Pub. No.: WO2011/077812
PCT Pub. Date: Jun. 30, 2011

(65) Prior Publication Data
US 2012/0269491 A1    Oct. 25, 2012

(30) Foreign Application Priority Data

Dec. 25, 2009   (JP) ................. P2009-294401

(51) Int. Cl.
*H04N 5/775* (2006.01)
*H04N 9/80* (2006.01)

(52) U.S. Cl.
USPC .......................................... 386/230; 386/239

(58) Field of Classification Search
USPC ................................................ 386/230, 239
See application file for complete search history.

(56) References Cited

U.S. PATENT DOCUMENTS

| 8,347,224 B2* | 1/2013 | Abe et al. ................. 715/781 |
| 2007/0245267 A1* | 10/2007 | Nakamura et al. ......... 715/838 |
| 2008/0159708 A1* | 7/2008 | Kazama et al. ............ 386/69 |

FOREIGN PATENT DOCUMENTS

| JP | 08-149384 | 6/1996 |
| JP | 2003-263148 A | 9/2003 |
| JP | 2005-275885 A | 10/2005 |
| JP | 2006-268295 A | 10/2006 |
| JP | 2006-313485 A | 11/2006 |
| JP | 2007-272701 A | 10/2007 |
| JP | 2007-280332 A | 10/2007 |
| JP | 2008-090374 A | 4/2008 |
| JP | 2008-167082 A | 7/2008 |
| JP | 2008-293360 A | 12/2008 |
| JP | 2009-089301 A | 4/2009 |
| JP | 2009-258667 A | 11/2009 |

* cited by examiner

*Primary Examiner* — Gelek W Topgyal
(74) *Attorney, Agent, or Firm* — Nath, Goldberg & Meyer; Jerald L. Meyer; Stanley N. Protigal

(57) ABSTRACT

The total number of object images is "N". Object images whose the number is less than "N" are displayed on a display among the N-object images according to a previously defined display rule. When a selected object image is shifted by n-object images, a position obtained by shifting by a distance becomes a new position of the selected object image, wherein the distance is obtained by multiplying by "n" a value obtained by dividing the distance between a display position of an object image and a display position of the selected object image by a value obtained by subtracting "1" from "N".

9 Claims, 7 Drawing Sheets

OBJECT IMAGE DISPLAY APPARATUS, OBJECT IMAGE DISPLAY METHOD AND OBJECT IMAGE DISPLAY PROGRAM

This is a National Phase Application filed under 35 U.S.C. 371 as a national stage of PCT/JP2010/067828, filed Oct. 12, 2010, and claims priority benefit from Japan Application No. 2009-294401, filed Dec. 25, 2009, the content of each of which is hereby incorporated by reference in its entirety.

TECHNICAL FIELD

The present invention relates to an object image display apparatus and method that display object images on a display, and an object image display program that causes a computer to carry out processing for displaying the object images on the display.

BACKGROUND ART

For example, in order to select any object image from among object images such as thumbnail images of contents data, images to be used to select any channel from among channels received by a tuner, or icons indicative of application programs, the object images are displayed on a display. An object image display apparatus and method that display object images on a display are described in Patent Literatures 1 to 5, for example.

Citation List

Patent Literature

Patent Literature 1: Japanese Patent Application Laid-open Publication No. 2003-263148
Patent Literature 2: Japanese Patent Application Laid-open Publication No. H08 (1996)-149384
Patent Literature 3: Japanese Patent Application Laid-open Publication No. 2006-268295
Patent Literature 4: Japanese Patent Application Laid-open Publication No. 2007-272701
Patent Literature 5: Japanese Patent Application Laid-open Publication No. 2008-293360

SUMMARY OF INVENTION

Technical Problem

With increase in capacity of a record medium, the amount of contents data to be recorded in the record medium increases. Because of this, when any piece of contents data is selected from among plural pieces of contents data recorded in the record medium, the number of thumbnail images to be displayed on a display increases. Also, with increase in the number of channels in a television broadcast, the number of images to be used to select a channel increases. Thus, the number of object images to be displayed on a display remarkably increases.

However, the number of object images to be displayed within one screen in a display is limited. Because of this, when there are a number of objects such as contents data, channels and application programs and there are a number of object images to be displayed on a display, it is necessary to display object images, which are a part thereof, on the display and shift the displayed object images in series until a target object image is displayed. When there are a number of objects, it is not easy to recognize where an object is located in all objects, the object corresponding to an object image selected at a certain point.

Under such a problem, the present invention has an object to provide an object image display apparatus, an object image display method and an object image display program capable of, when object images are displayed on a display and any object image is selected, visually recognizing where an object is located in all objects, the object corresponding to the selected object image, and visually and easily understanding shift of object image.

Solution to Problem

In order to resolve the above-described conventional technical problem, the present invention provides an object image display apparatus comprising: an object image generator (106, 107b) that generates object images corresponding to N-objects to be used to select any object from among the N-objects, wherein the number "N" is a natural number more than "1"; and a controller (107, 110) that controls to display on a display object images whose the number is less than "N" among the N-object images according to a previously defined display rule, wherein as the display rule, the controller displays as a selected object image, at the time of selecting a first object image corresponding to a first object having the highest rank in an arrangement sequence in which the N-objects are arranged according to a certain order, the first object image on a first position in the display, and arranges and displays as non-selected object images, object images corresponding to objects having ranks below the first object by a certain number; displays as a selected object image, at the time of selecting a second object image corresponding to a second object having the lowest rank in the arrangement sequence in which the N-objects are arranged according to a certain order, the second object image on a second position in the display, and arranges and displays as non-selected object images, object images corresponding objects having ranks above the second object by a certain number; arranges and displays as non-selected object images, at the time of selecting a third object image corresponding to a third object which is any object arranged between the first object and the second object, one or more object images corresponding to objects having ranks below the third object image and one or more object images corresponding to objects having ranks above the third object by a certain number, on a region including an area outside the first position in the display, an area between the first position and the second position, and an area outside the second position in the display; and controls, when the third object image which is the selected object image is shifted by n-objet images between the first object image and the second object image, such that a position obtained by shifting by a distance becomes a new position of the selected object image, wherein the distance is obtained by multiplying by "n" a value obtained by dividing the distance between the first position and the second position by a value obtained by subtracting "1" from "N", and the number "n" is a natural number equal to or more than "1".

In the object image display apparatus, it is preferable that the controller controls to display the non-selected object images so as to become reduced in size with distance from the selected object image as the display rule.

In the object image display apparatus, it is preferable that the controller controls to display the non-selected object images so as to increase a ratio of area for overlapping an adjacent object image with distance from the selected object image as the display rule.

In order to resolve the above-described conventional technical problem, the present invention provides an object image display method comprising: a first step of displaying on a display object images corresponding to objects whose the number is less than "N" among N-objects according to a previously defined display rule, wherein the number "N" is a natural number more than "1"; and a second step of shifting a display state of object images according to the display rule in response to an operation for shifting an object image selected from among the object images displayed on the display, wherein as the display rule, the first step displays, at the time of displaying on the display as a selected object image, a first object image corresponding to a first object having the highest rank in an arrangement sequence in which the N-objects are arranged according to a certain order, the first object image on a first position in the display, and arranges and displays as non-selected object images, object images corresponding to objects having ranks below the first object by a certain number; displays, at the time of displaying on the display as a selected object image, a second object image corresponding to a second object having the lowest rank in the arrangement sequence in which the N-objects are arranged according to a certain order, the second object image on a second position in the display, and arranges and displays as non-selected object images, object images corresponding to objects having ranks above the second object by a certain number; and arranges and displays as non-selected object images, at the time of displaying on the display as a selected object image, a third object image corresponding to a third object which is any object arranged between the first object and the second object, one or more object images corresponding to objects having ranks below the third object image and one or more object images corresponding to objects having ranks above the third object by a certain number, on a region including an area outside the first position in the display, an area between the first position and the second position, and an area outside the second position in the display, and as the display rule, the second step shifts, when the third object image which is the selected object image is shifted by n-objet images between the first object image and the second object image, such that a position obtained by shifting by a distance becomes a new position of the selected object image, wherein the distance is obtained by multiplying by "n" a value obtained by dividing the distance between the first position and the second position by a value obtained by subtracting "1" from "N", and the number "n" is a natural number equal to or more than "1".

In the object image display method, it is preferable that the first step displays the non-selected object images so as to become reduced in size with distance from the selected object image as the display rule.

In the object image display method, it is preferable that the first step displays the non-selected object images so as to increase a ratio of area for overlapping an adjacent object image with distance from the selected object image as the display rule.

In order to resolve the above-described conventional technical problem, the present invention provides an object image display program for causing a computer to execute: a first step of displaying on a display object images corresponding to objects whose the number is less than "N" among N-objects according to a previously defined display rule, wherein the number "N" is a natural number more than "1"; and a second step of shifting a display state of object images according to the display rule in response to an operation for shifting an object image selected from among the object images displayed on the display, wherein as the display rule, the first step displays, at the time of displaying on the display as a selected object image, a first object image corresponding to a first object having the highest rank in an arrangement sequence in which the N-objects are arranged according to a certain order, the first object image on a first position in the display, and arranges and displays as non-selected object images, object images corresponding to objects having ranks below the first object by a certain number; displays, at the time of displaying on the display as a selected object image, a second object image corresponding to a second object having the lowest rank in the arrangement sequence in which the N-objects are arranged according to a certain order, the second object image on a second position in the display, and arranges and displays as non-selected object images, object images corresponding to objects having ranks above the second object by a certain number; and arranges and displays as non-selected object images, at the time of displaying on the display as a selected object image, a third object image corresponding to a third object which is any object arranged between the first object and the second object, one or more object images corresponding to objects having ranks below the third object image and one or more object images corresponding to objects having ranks above the third object by a certain number, on a region including an area outside the first position in the display, an area between the first position and the second position, and an area outside the second position in the display, and as the display rule, the second step shifts, when the third object image which is the selected object image is shifted by n-objet images between the first object image and the second object image, such that a position obtained by shifting by a distance becomes a new position of the selected object image, wherein the distance is obtained by multiplying by "n" a value obtained by dividing the distance between the first position and the second position by a value obtained by subtracting "1" from "N", and the number "n" is a natural number equal to or more than "1".

In the object image display program, it is preferable that the first step displays the non-selected object images so as to become reduced in size with distance from the selected object image as the display rule.

In the object image display program, it is preferable that the first step displays the non-selected object images so as to increase a ratio of area for overlapping an adjacent object image with distance from the selected object image as the display rule.

Advantageous Effects of Invention

According to the object image display apparatus, the object image display method and the object image display program of the present invention, when object images are displayed on a display and any object image is selected, it is possible to visually recognize where an object is located in all objects, the object corresponding to the selected object image, and visually and easily understand shift of object image. This can improve usability when a user selects an object.

DESCRIPTION OF EMBODIMENTS

Figure 1:
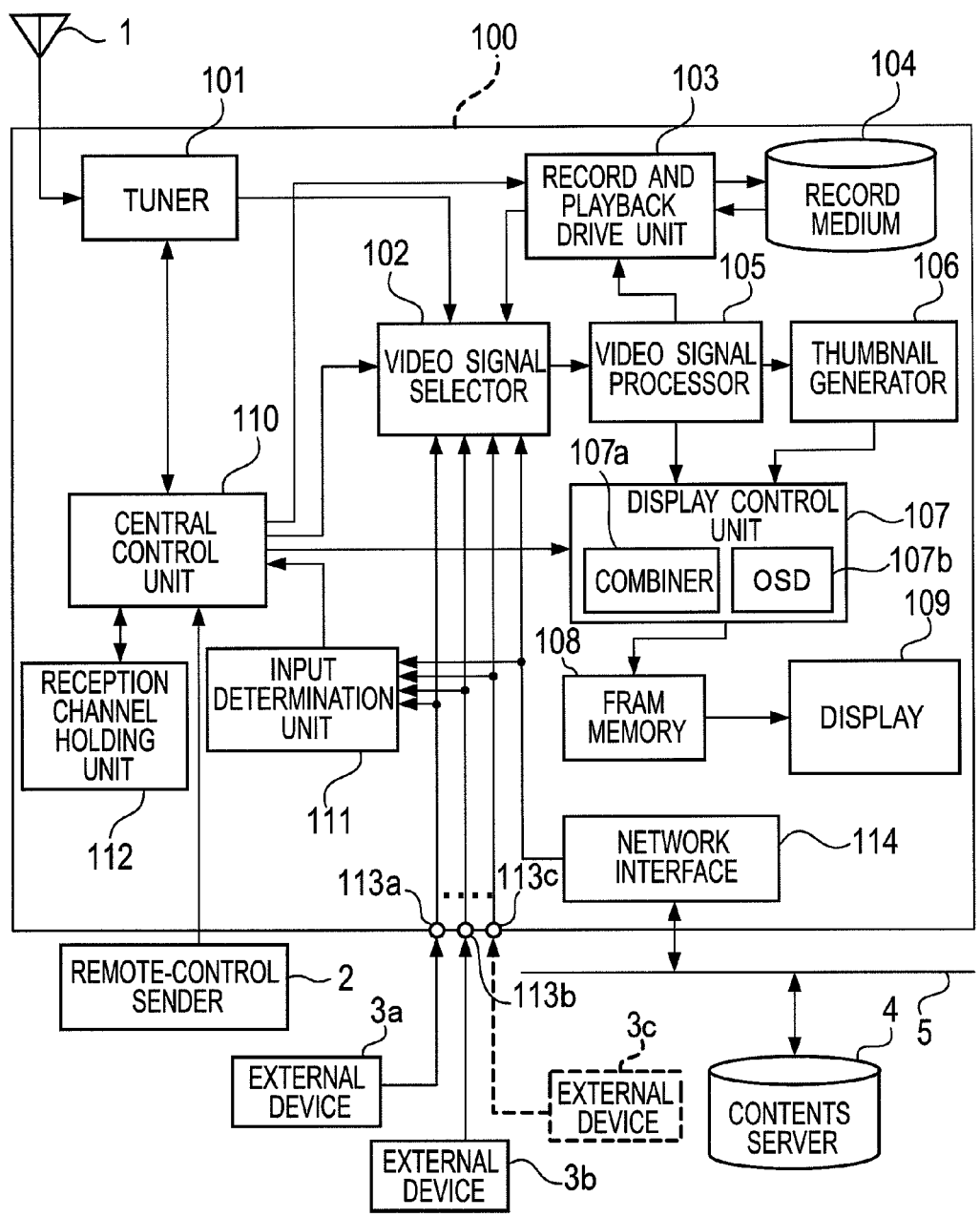
FIG. 1 is a block diagram that illustrates an object image display apparatus according to an exemplary embodiment of the present invention.

An object image display apparatus, an object image display method and an object image display program of the present invention will be described below with reference to accompanying drawings. In the present embodiment, a broadcasting receiver 100 including a record and playback device therein is cited as an example of the object image display apparatus. In FIG. 1, a tuner 101 receives a broadcast wave signal of a television broadcasting which is input from an antenna 1, and demodulates a certain broadcast signal (contents data). The tuner 101 may be a receiving portion for receiving a terrestrial broadcast wave signal or a receiving portion for receiving a satellite broadcast wave signal, or may include both of the receiving portions. A broadcast wave signal may be received via a cable instead of the antenna 1. A video signal of the modulated broadcast signal is supplied to a video signal selector 102. It is noted that a configuration regarding an audio signal is omitted in FIG. 1.

A record and playback portion is composed of a record and playback drive unit 103 and a record medium 104. When a central control unit 110 such as a microcomputer instructs the record and playback drive unit 103 to play back a video signal recorded in the record medium 104, the record and playback drive unit 103 plays back the video signal recorded in the record medium 104 and supplies it to the video signal selector 102. The record medium 104 is a hard disk drive (HDD), a semiconductor memory or the like, for example. The record medium 104 may be detachable relative to the broadcasting receiver 100.

The broadcasting receiver 100 includes external input terminals 113a, 113b and 113c which are HDMI (High-Definition Multimedia Interface) terminals for example, and the like. The external input terminals 113a, 113b and 113c and the like are collectively called an external input terminal 113. A video signal from the external input terminal 113 or a video signal from a contents server 4 via a network interface 114 is input into the video signal selector 102. Thus, video signals from video signal supply sources can be supplied to the video signal selector 102.

The video signal selector 102 selects any video signal based on an instruction from a central control unit 110 and supplies it to a video signal processor 105. The video signal selector 102 may select video signals and supplies them to the video signal processor 105. In the present embodiment, the tuner 101, the record medium 104, the external input terminal 113 and the network interface 114 for receiving a video signal from the contents server 4 outside the apparatus are cited as an example of the video signal supply source, but it is not necessary to include them and it may include any one of them.

The video signal processor 105 carries out various pieces of signal processing with respect to an input video signal and supplies it to the record and playback drive unit 103, a thumbnail generator 106 and a display control unit 107. When the record and playback drive unit 103 is instructed to record a video signal from any of the tuner 101, the external input terminal 113 and the network interface 114 by the central control unit 110, it records the video signal output from the video signal processor 105. The thumbnail generator 106 generates a thumbnail image signal based on an input video signal. The thumbnail image signal is a still image signal at a specific point in time in an initial part of contents data for example, or a dynamic image signal during a certain period. It may be configured to record in the record medium 104 the thumbnail image signal generated in the thumbnail generator 106 (not shown in FIG. 1).

The display control unit 107 writes the video signal output from the video signal processor 105 into a frame memory 108 in series. A video signal read out from the frame memory 108 is supplied to a display 109 and displayed. The display control unit 107 includes a combiner 107a and an on-screen-display (OSD) generator 107b. When the display control unit 107 is instructed to display a thumbnail image by the central control unit 110, the combiner 107a combines the video signal output from the video signal processor 105 and the thumbnail image signal output from the thumbnail generator 106 and writes them into the frame memory 108. Thus, an image in which a thumbnail image is overlapped on an image corresponding to a video signal supplied from the video signal supply source including the tuner 101 and the like, is displayed on the display 109. Only the thumbnail image may be displayed on the display 109.

The thumbnail image of the video signal (contents data) is one example of an object image to be displayed on the display 109 according to an object image display method of the present embodiment which will be described later.

A user can change a channel (broadcast station) received by the tuner 101 according to an operation of a remote-control sender 2. An operation signal for changing a channel sent from the remote-control sender 2 is input into the central control unit 110. The central control unit 110 controls the tuner 101 so as to change a channel. A reception channel holding unit 112 holds channel information received by the tuner 101. The central control unit 110 controls the tuner 101 so as to receive a channel of a channel number specified by the remote-control sender 2 with reference to the channel information held by the reception channel holding unit 112.

A channel is changed by operating a channel change button of the remote-control sender 2. Also, a channel received by the tuner 101 may be changed after images for indicating channel numbers of channels received by the tuner 101 or images for indicating names of broadcast stations of respective channels are displayed on the display 109. In this case, after images for indicating channel numbers or names of broadcast stations are generated by an OSD generator 107b and then displayed on the display 109, an image of a target channel is selected by a cursor button of the remote-control sender 2 and then determined by a determination button.

The images for indicating channel numbers of channels received by the tuner 101 or the images for indicating names of broadcast stations of respective channels are another example of the object image to be displayed on the display 109 according to the object image display method of the present embodiment which will be described later.

In an example shown in FIG. 1, external devices 3a and 3b each of which is a playback device or a record and playback device of a video signal are connected to the external input terminals 113a and 113b. A non-connection external device 3c may be connected to the external input terminal 113c. The contents server 4 stores a video signal (contents data) and is connected to a network 5 such as Internet. A video signal is received from the contents server 4 via a network interface 114. An input determination unit 111 determines whether or not a video signal is input from the external input terminal 113 and the network interface 114 and supplies determination information to the central control unit 110.

An image for selecting a video signal supply source such as the tuner 101, the record medium 104, the external input terminal 113 or the contents server 4 is another example of the object image to be displayed on the display 109 according to the object image display method of the present embodiment which will be described later.

Figure 2:
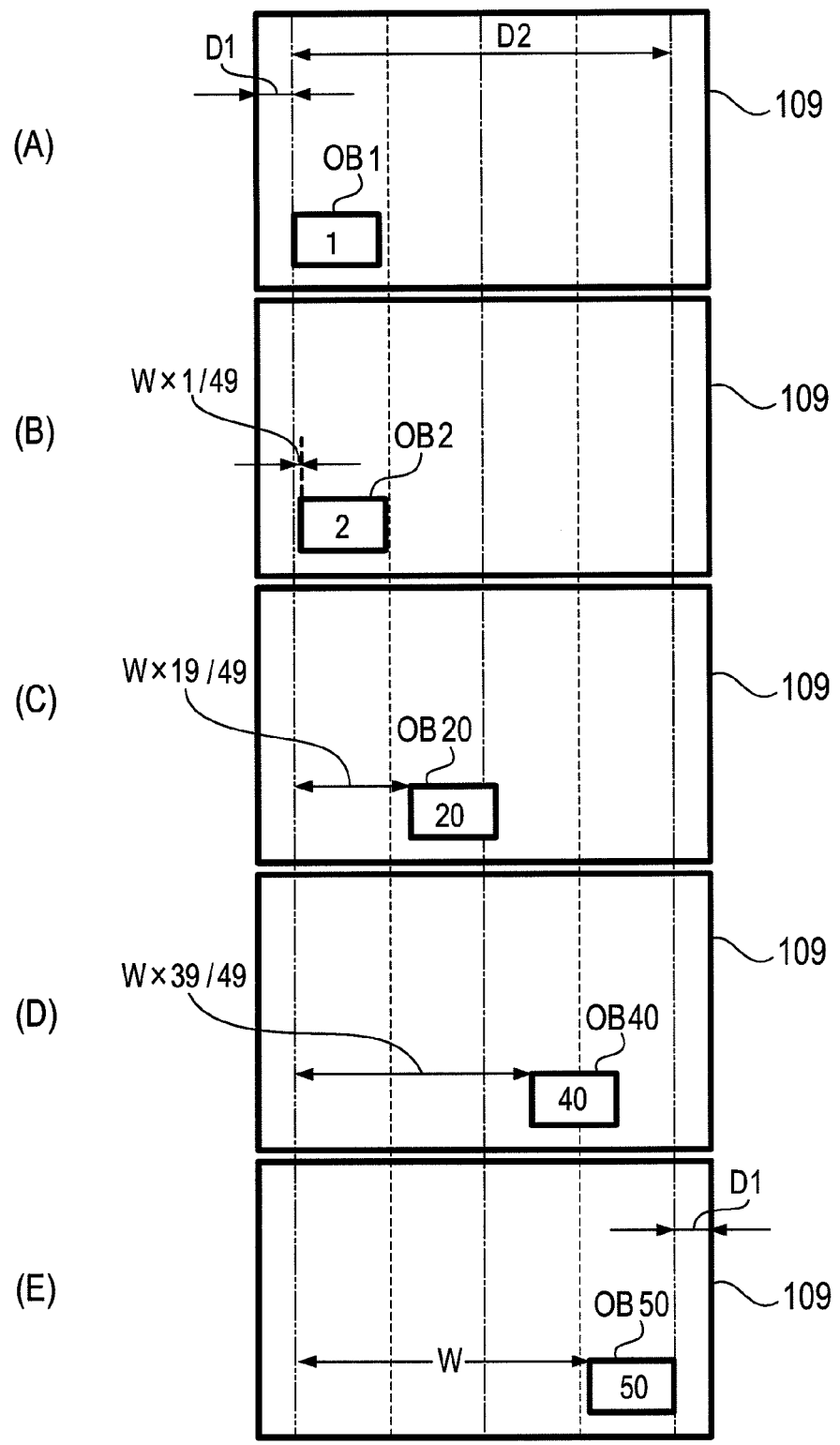
FIG. 2 is a diagram that illustrates an object image display method according to the exemplary embodiment of the present invention.
Figure 3:
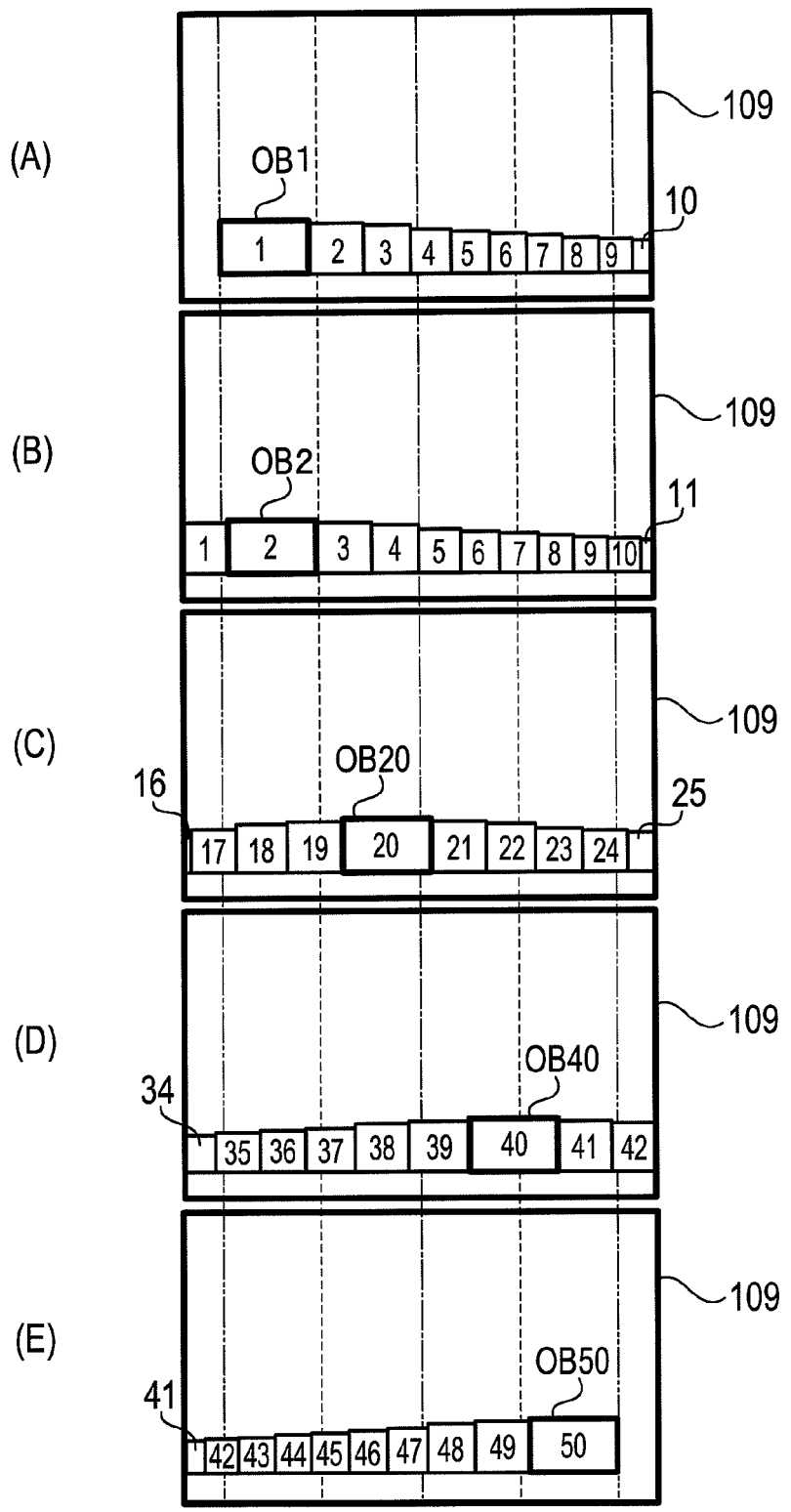
FIG. 3 illustrates display examples of object images according to the object image display method of the exemplary embodiment.

Next, the object image display method of the present embodiment will be described below, with reference to FIGS. 2 and 3. The object image display method of the present embodiment which will be described below is executed by a software (computer program) stored in the central control unit 110. FIGS. 2 and 3 are an example where the total number of object images is fifty. For example, in a case where object images are displayed on the display 109 according to object image signals such as thumbnail image signals, an arrangement sequence is previously set to the object image signals. In a case where object images are thumbnail images, the arrangement sequence is an order of date when contents data is recorded in the record medium 104, for example. In a case where object images are images for indicating channel numbers, the arrangement sequence is an order of channel number, for example.

FIGS. 2(A) to (E) are states each where only the selected object image is shown. FIG. 2(A) shows a state where only the first object image OB1 in the arrangement sequence is displayed on the display 109 among the fifty object images. The object image OB1 is separated by a certain distance from the lower end portion of the screen of the display 109, and displayed at a position away from the left end portion by a certain distance D1. FIG. 2(E) shows a state where only the last object image OB50 in the arrangement sequence is displayed on the display 109 among the fifty object images. The object image OB50 is separated by the certain distance from the lower end portion of the screen of the display 109, and displayed at a position away from the right end portion by the certain distance D1. Here, although the distance D1 from the left end portion is equal to the distance D1 from the right end portion, they may differ from each other. It is noted that numerical characters corresponding to the arrangement sequence are assigned object images shown in FIGS. 2 and 3 in order to promote understanding.

In a case where each of the fifty object images from the object image OB1 to the object image OB50 is an selected object image, it is displayed within a range of distance D2 between two-dot chain lines on the sides of the screen. It is noted that a chain line is a line passing on the center in the horizontal direction of the screen, and a dashed line is a line passing on the center between the two-dot chain line and the chain line. These two-dot chain line, chain line and dashed line are shown in order to promote understanding of the object image display method of the present embodiment. As will be understood by FIG. 3 which will described later, since it is difficult to display all fifty object images within the range of distance D2, a predetermined number of object images less than fifty is displayed in the screen. The object images to be displayed in the screen are object images associated with a selected object image.

As shown in FIG. 2(E), the distance between the object image OB1 and the object image OB50 is "W". FIG. 2(B) shows a state where only the second object image OB2 in the arrangement sequence is displayed on the display 109 among the fifty object images. The object image OB2 is displayed at a position where the object image OB1 is shifted rightward in the horizontal direction by a distance W×1/49. FIG. 2(C) shows a state where only the twentieth object image OB20 in the arrangement sequence is displayed on the display 109 among the fifty object images. The object image OB20 is displayed at a position where the object image OB1 is shifted rightward in the horizontal direction by a distance W×19/49.

FIG. 2(D) shows a state where only the fortieth object image OB40 in the arrangement sequence is displayed on the display 109 among the fifty object images. The object image OB40 is displayed at a position where the object image OB1 is shifted rightward in the horizontal direction by a distance W×39/49.

Thus, in the object image display method of the present embodiment, when an object image to be selected is shifted from i-th ("i" is an integer equal to or more than "1") to (i+1)-th, a display position in the horizontal direction is shifted by the distance W×1/49. A display position of i-th object image is a position shifted by a distance W×(i−1)/49 from the display position of the object image OB1. In a case where a number "n" is a natural number equal to or more than "1", when an object image to be selected is shifted from i-th by "n" object images, a display position in the horizontal direction of an object image to be newly selected is shifted from the i-th object image by a distance (W×1/49)×n.

FIGS. 3(A) to (E) show states each where a selected object image and non-selected object images to be displayed together with the selected object image are displayed on the display 109. The selected object image is shown in a heavy solid line and the non-selected object images are shown in a fine solid line. In FIG. 3(A) in which the object image OB1 is the selected object image, the second to tenth non-selected object images in the arrangement sequence are displayed in such a manner that a portion of each object image overlaps an adjacent object image. As shown in FIG. 3(A), the tenth non-selected object image is displayed outside the two-dot chain line on the right side of the screen.

In FIG. 3(B) in which the object image OB2 is the selected object image, the first and third to eleventh non-selected object images in the arrangement sequence are displayed in such a manner that a portion of each object image overlaps an adjacent object image. As shown in FIG. 3(B), the first non-selected object image is displayed outside the two-dot chain line on the left side of the screen. In a similar way, in FIG. 3(C) in which the object image OB20 is the selected object image, non-selected object images located at right and left sides of the object image OB20 are displayed, and in FIG. 3(D) in which the object image OB 40 is the selected object image, non-selected object images located at right and left sides of the object image OB 40 are displayed. As shown in FIGS. 3(B) to (D), the full width of the screen of the display 109 in horizontal direction is set as a display region, but non-display regions may be set the right and left sides.

In FIG. 3(E) in which the object image OB50 is the selected object image, the forty-second to forty-ninth non-selected object images in the arrangement sequence are displayed in such a manner that a portion of each object image overlaps an adjacent object image.

In the examples shown in FIG. 3, lower end portions of the selected object image and the non-selected object images are located in the same position in the vertical direction, and the non-selected object image becomes reduced in size with distance from the selected object image. Also, the non-selected object image has a large ratio in which it overlaps an adjacent object image with distance from the selected object image. The non-selected object image may be gradually reduced using an arbitrary recurrence formula or function. As well, a coordinate, in which a ratio in which the non-selected object image overlaps an adjacent object image gradually increases, may be determined using an arbitrary recurrence formula or function.

As can be seen from FIGS. 3(A) to (E), in the object image display method of the present embodiment, a position of the selected object image on the screen in the horizontal direction roughly indicates a relative position in the arrangement sequence of all object images. For example, in FIG. 3(C) in which the object image OB20 is the selected object image, since the object image OB20 slightly deviates to the left side relative to the center line indicated by the chain line in the horizontal direction, it is possible to recognize that the object image OB20 which is currently selected is ranked slightly higher than the median in the arrangement sequence of all object images.

Figure 4:
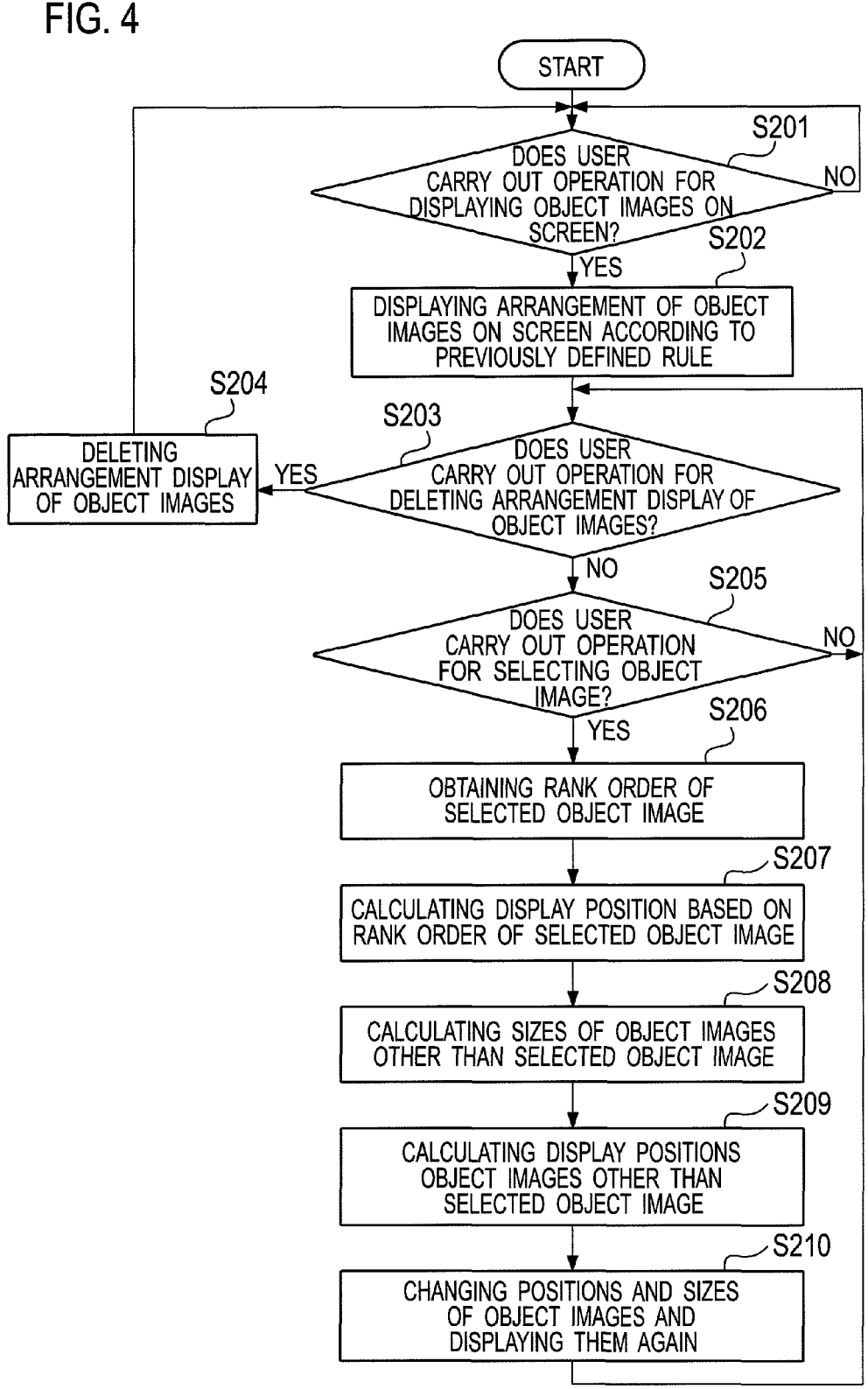
FIG. 4 is a flowchart that illustrates operation of the object image display apparatus according to the exemplary embodiment.

Next, an operation at the time when an object image is displayed according to the object image display method of the present embodiment will be described with reference to FIG. 4. In FIG. 4, the central control unit 110 determines whether or not a user carries out an operation for displaying object images on the screen in step S201. The operation for displaying object images on the screen is one for displaying thumbnail images of contents data recorded in the record medium 104 using the remote-control sender 2 as shown in FIG. 3, for example. If it is determined that the operation is carried out (YES), the process proceeds to step S202. If it is not determined that the operation is carried out (NO), the step S201 is repeated. The central control unit 110 controls each portion in the broadcasting receiver 100 so as to display an arrangement of object images on the screen of the display 109 according to a previously defined rule in the step S202. The screen in the step S202 has an initial state. The screen has an arbitrary initial state.

The central control unit 110 determines whether or not the user carries out an operation for deleting the arrangement display of object images in step S203. The operation for deleting is one for pushing a delete button or a return button mounted on the remote-control sender 2, for example. If it is determined that the operation for deleting is carried out in the step S203 (YES), the arrangement display of object images is deleted in step S204 and the process returns to step S201. If it is not determined that the operation for deleting is carried out in the step S203 (NO), the process proceeds to step S205. The central control unit 110 determines whether or not the user carried out an operation for selecting an object image in the step S205. The operation for selecting an object image is one for pushing a rightward or a leftward cursor button mounted on the remote-control sender 2, for example.

If it is determined that the operation for selecting an object image is carried out in the step S205 (YES), the process proceeds to step S206. If it is not determined that the operation for selecting an object image is carried out (NO), the process returns to the step S203. The central control unit 110 obtains a rank order of the selected object image in the step S206. For example, when an operation for pushing the rightward cursor button is carried out from the state of FIG. 3(A), the selected object image has a rank order "2". When an operation for pushing the rightward cursor button is carried out from the state of FIG. 3(B), the selected object image has a rank order "3". When an operation for pushing the leftward cursor button is carried out from the state of FIG. 3(B), the selected object image has a rank order "1".

Then, the central control unit 110 calculates a display position based on the rank order of the selected object image in step S207. The display position of the selected object image has been described with reference to FIG. 2, and more specifically the display position is calculated as follows. The total number of object images is defined as "N" (N is a natural number more than "1") and the rank order of the selected object image is defined as "i". The display position of the object image OB1 having the top rank order which is the first in the arrangement sequence is defined as (X1, Y1). It is noted that the display position of the object image is a coordinate of the upper left corner. The display position of the object image having the bottom rank order which is the last in the arrangement sequence is defined as (XN, Y1). The position in the horizontal direction is defined as "Xi" ("i" is one of "1" to "N") and the position in the vertical direction is defined as "Y1" which is fixed. The object image having the bottom rank order is called an object image OBN. In the examples of FIG. 3, the object image OBN is the object image OB50 and "XN" is "X50".

The distance |XN−X1| between the object image OB1 and the object image OBN is "W". When the object image having a rank order "i" is selected, the display position (Xi, Yi) thereof is (X1+W×(i−1)/(N−1), Y1). In the examples of FIG. 3, the display position of the object image OB2 is (X1+W/49, Y1), the display position of the object image OB20 is (X1+W×19/49, Y1), the display position of the object image OB40 is (X1+W×39/49, Y1) and the display position of the object image OB50 is (X1+W, Y1).

Figure 5:
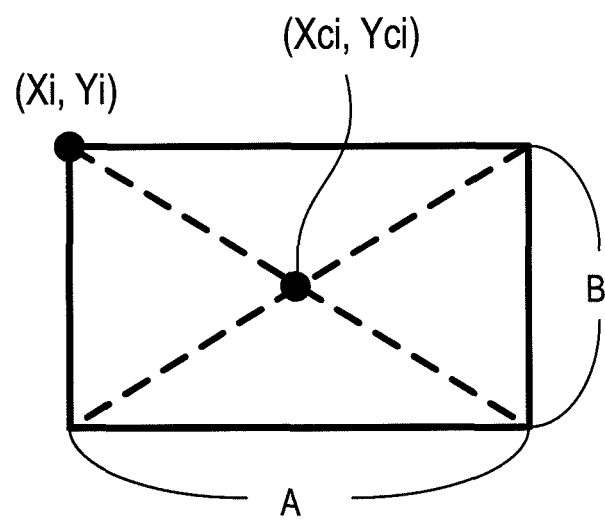
FIG. 5 is a diagram that illustrates operation of the object image display apparatus according to the exemplary embodiment.

Next, the central control unit 110 calculates sizes of non-selected object images other than the selected object image in step S208. As shown in FIG. 5, when the size of the selected object image is (horizontal size, vertical size)=(A, B), the size (Ak, Bk) of the k-th object image from the selected object image is (f(|k|)×A, f(|K|)×B). The function "f(x)" is a function which monotonically decreases if "x>0" and meets the condition "1>f(x)>0". For example, the function "f(x)" is "f(x)=1/(1+x)", "f(x)=(½)$^x$" or the like. The number "k" of the k-th from the selected object image may have a positive value or a negative value. Namely, the object image having a rank order "i+|k|" has the same size as the object image having a rank order "i−|k|". It is noted that the number "k" has a positive value when the non-selected object image is the |k|-th object image at the right side with respect to the selected object image, and the number "k" has a negative value when the non-selected object image is the |k|-th object image at the left side with respect to the selected object image, in the horizontal direction of the screen of the display 109.

Continuously, the central control unit 110 calculates the display positions of the non-selected object images other than the selected object image in step S209. In the present embodiment, as described the above, the display position of the non-selected object image other than the selected object image is calculated in such a manner that the non-selected object image has a large ratio in which it overlaps an adjacent object image with distance from the selected object image. As shown in FIG. 5, the central coordinate (Xci, Yci) of the selected object image is (Xi+A/2, Yi−B/2).

The coordinate (Xk, Yk) of the display position of the k-th object image from the selected object image is (Xi+A/2+g(|k|)−Ak/2, Yi−B+Bk) when it is located at the right side of the selected object image, and is (Xi+A/2−g(|k|)−Ak/2, Yi−B+Bk) when it is located at the left side of the selected object image. The function "g(x)" is a function which monotonically increases if "x>0" and meets the condition "g(x) >0". It is preferable to use a function which realizes object images overlap, as the function "g(x)".

Then, the central control unit 110 controls the display control unit 7 so as to change the positions and sizes of all object images including the selected object image and the non-selected object images and display them on the display 109 again in step S210. If object images overlap, an object image having the smallest absolute value k is displayed on the display 109. Thereby, the selected object image can be sequentially shifted rightward from the state of FIG. 3(A) to the state of FIG. 3(E) when the rightward cursor button mounted on the remote-control sender 2 is pushed. Also, the selected object image can be sequentially shifted leftward from the state of FIG. 3(E) to the state of FIG. 3(A) when the leftward cursor button is pushed.

It is preferable that the display state at the step S202 is gradually changed to the display state at the S210 when the display state at the step S202 is shifted to the display state at the step S210. Since the shift between two display states is carried out over a certain time, a user can easily recognize the shift of the selected object image.

Figure 6:
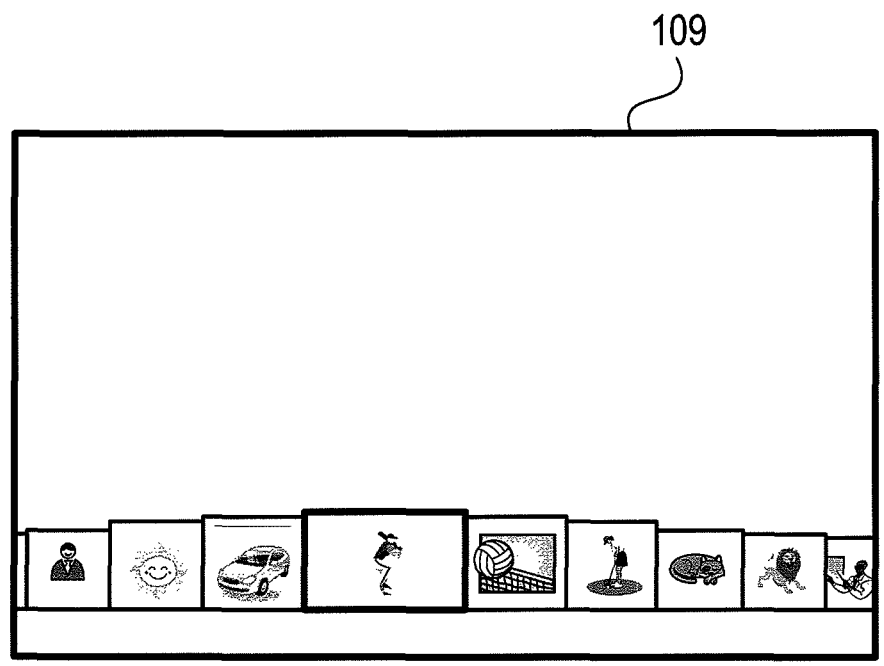
FIG. 6 illustrates an example in which thumbnail images are displayed as object images using the display examples illustrated in FIG. 3.
Figure 7:
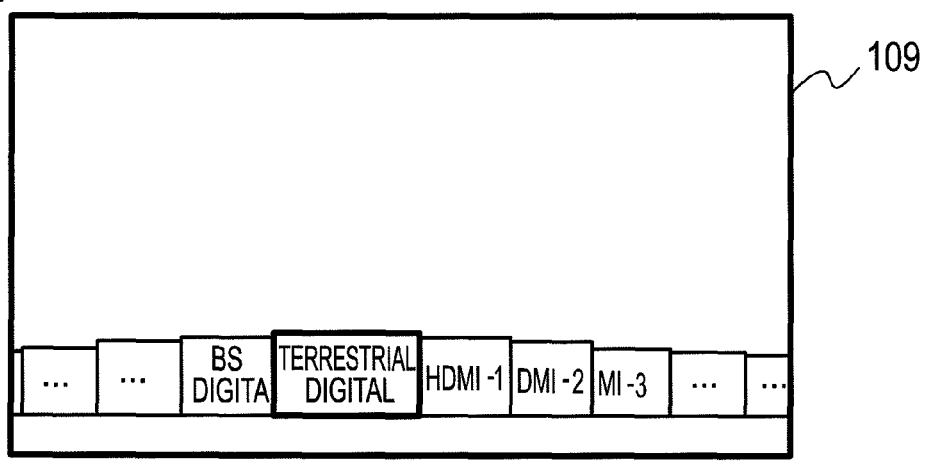
FIG. 7 illustrates an example in which images to be used to select a video signal supply source are displayed as object images using the display examples illustrated in FIG. 3

FIGS. 6 to 9 are concrete display examples of object images. FIG. 6 is an example in which thumbnail images of contents data recorded in the record medium 104 are displayed as object images. For example, picture data of still images taken by a digital still camera may be displayed as object images. In this case, a display state is similar to FIG. 6. FIG. 7 is an example in which images to be used to select a video signal supply source such as the tuner 101, the record medium 104, the external input terminal 113 or the contents server 4 are displayed as object images. The example of FIG. 7 shows the state where one of terrestrial digital broadcasting and BS (broadcasting satellite) digital broadcasting can be selected by the tuner 101. This shows the state where the external input terminals 113a, 113b and 113c are respectively HDMI-1, HDMI-2 and HDMI-3.

Figure 8:
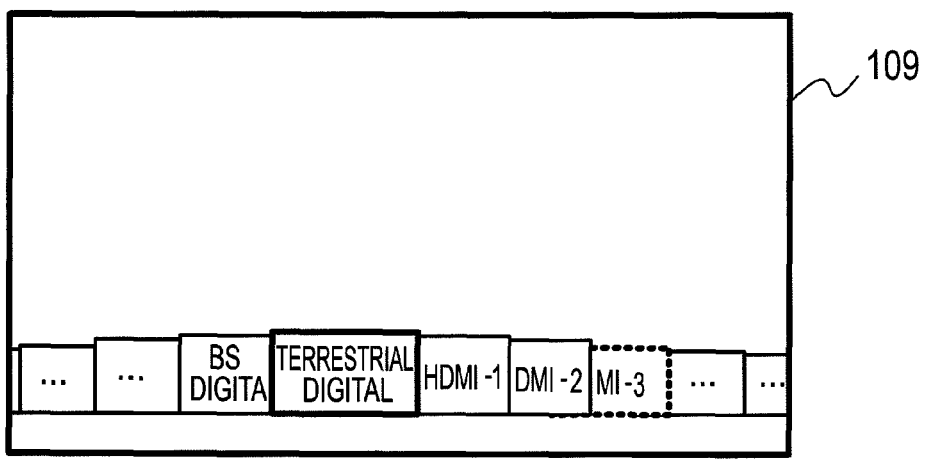
FIG. 8 illustrates another example in which images to be used to select a video signal supply source are displayed as object images using the display examples illustrated in FIG. 3.

FIG. 8 in an example in which images to be used to promote understanding by a user that a video signal supply source from which the input determination unit 111 determines that a video signal is not input can not be selected. In the example of FIG. 1, the object image of HDMI-3 is displayed using a short dashed line because the external device 3c is not connected to the external input terminal 113c (HDMI-3). An object image which can not be selected may be displayed in a light color or a different color, or may be not displayed. In a case where a power is not supplied to an external device even if the external device is physically connected, the input determination unit 111 determines that a video signal is not input. Thus, the case where a power is not supplied to an external device has the similar display state.

Figure 9:
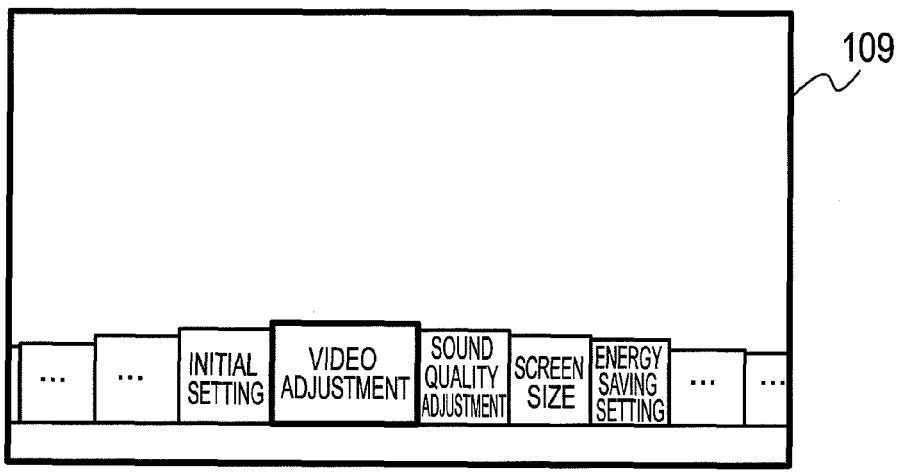
FIG. 9 illustrates an example in which menu images are displayed as object images using the display examples illustrated in FIG. 3.

FIG. 9 is an example in which menu images to be used to adjust various setting in the broadcasting receiver 100 are displayed as object images. As the menu images, an initial setting, a video adjustment, a sound quality adjustment, a screen size, an energy saving setting, and the like are displayed. Also, images such as icons to be used to select application programs may be displayed as object images.

As describe above, according to the object image display method of the present embodiment, for example, in a case of shifting from the state of FIG. 3(A) to the state of FIG. 3(B), the object image OB1 which is the selected object image is shifted leftward with respect to the two-dot chain line at the left side of the screen in a reduced size state and becomes the non-selected object image, and then the object image OB 2 becomes the selected object image. As well, when the immediate-left object image to which a number "49" is assigned is selected in the state of FIG. 3(E), the object image OB50 is shifted rightward with respect to the two-dot chain line at the right side of the screen in a reduced size state and becomes the non-selected object image, and the immediate-left object image becomes the selected object image. Thus, a user can visually and easily recognize the shift of object image.

Figure 10:
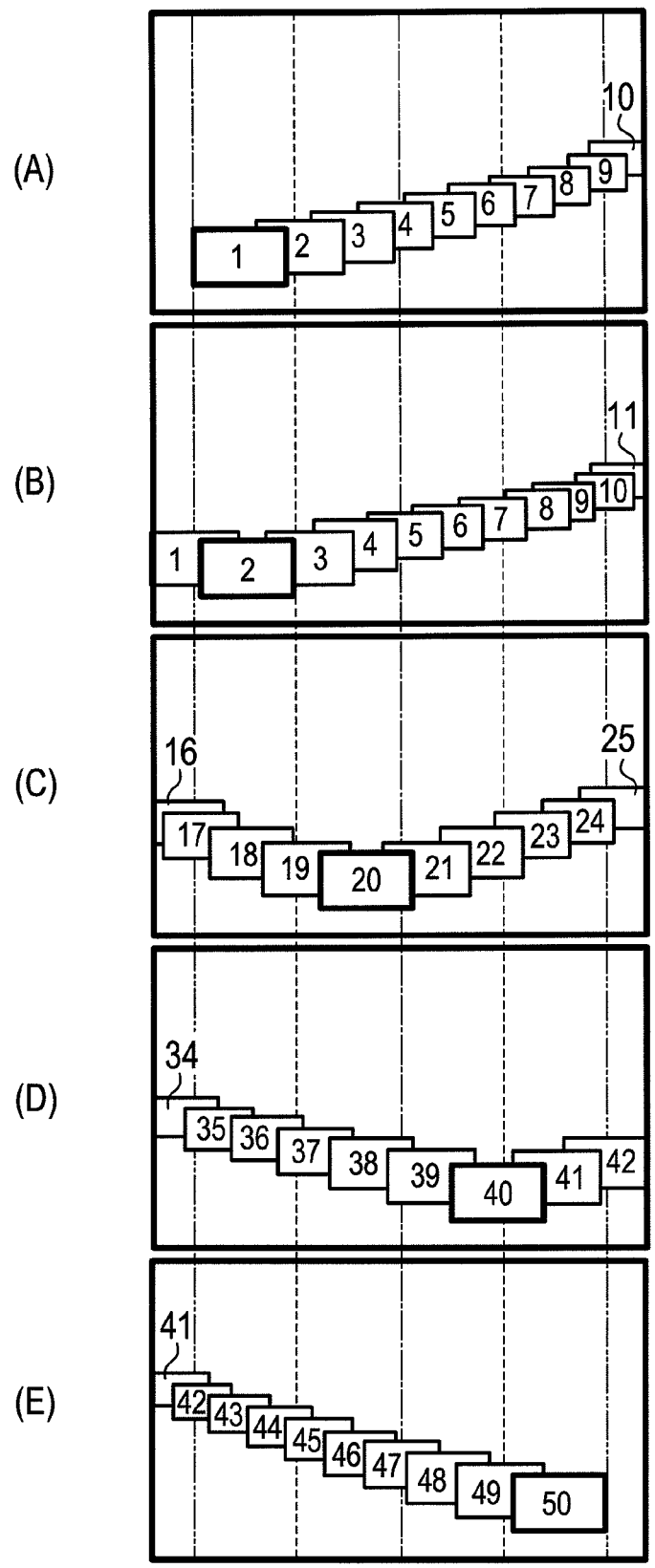
FIG. 10 illustrates a modified example of object images according to the object image display method of the exemplary embodiment.

Next, a modified example of the object image display method in the present embodiment will be described with reference to FIG. 10. The display method of FIG. 3 is an example of a case where lower end portions of the selected object image and the non-selected object images are located in the same position in the vertical direction. In contrast, in a display method of the modified example shown in FIG. 10, a lower end portion of each selected object image is located in the same position in the vertical direction and lower end portions of non-selected object images are located in different positions in the vertical direction. The positions in the vertical direction of lower end portions of non-selected object images may be sequentially changed according to any recurrence formula or function. In the modified example of FIG. 10, positions of non-selected object images arranged at both sides of the selected object image indicated by a heavy solid line are changed and displayed in an upper direction as departing from the selected object image. Each selected object image is displayed so as to be always located in the lowest position.

The object image display apparatus, the object image display method and the object image display program in the present embodiment described above will be described again. In FIG. 1, the thumbnail generator 106 or the OSD generator 107b is an object image generator that generates object images corresponding to N-objects to be used to select any object among the N-objects. The display control unit 107 and the central control unit 110 are a controller that controls to display on the display 109 object images whose the number is less than "N" among N-object images according to a previously defined display rule. It is not necessary for the object image generator to generate object images corresponding to N-object images simultaneously. It is only necessary to generate at least object images to be displayed on the display 109 corresponding to each screen on which each selected object image is to be shifted.

In the present embodiment, the central control unit 110 holds a display rule. The display rule is as follows. As shown in FIG. 3(A) and FIG. 10(A), when the first object image (object image OB1) is selected wherein the first object image corresponds to a first object having the highest rank in the arrangement sequence in which N-objects are arranged according to a certain order, it displays the first object image on a first position in the display 109 as the selected object image, and arranges and displays as the non-selected object images, object images by a certain number corresponding to objects having ranks below the first object. For example, the arrangement direction is the horizontal direction.

As shown in FIG. 3(E) and FIG. 10(E), when the second object image (object image OB50) is selected wherein the second object image corresponds to a second object having the lowest rank in the arrangement sequence in which N-objects are arranged according to the certain order, it displays the second object image on a second position in the display 109 as the selected object image, and arranges and displays as the non-selected object images, object images by a certain number corresponding to objects having ranks above the second object.

As shown in FIGS. 3(B) to (D) and FIGS. 10(B) to (D), the third object image (object image OB2, OB20, OB40 or the like) is selected wherein the third object image corresponds to a third object which is any object arranged between the first object and the second object, it displays the third object image between the first position and the second position as the selected object image. The selected object image has a state where the whole of object image is displayed. At the same time, at least one of one or more object images corresponding to objects having ranks below the third object image and one or more object images corresponding to objects having ranks above the third object image is arranged and displayed as the non-selected object images by a certain number between the first position and the second position.

As shown in FIGS. 3(B) to (D) and FIGS. 10(B) to (D), since the non-selected object images are displayed in regions outside the first position and the second position, both of the one or more object images corresponding to objects having ranks below the third object image and the one or more object images corresponding to objects having ranks above the third object image are displayed.

The number of non-selected object images to be displayed is determined according to a degree of reduction of the non-selected object images, a ratio in which adjacent object images overlap, and a determination which region of the display 109 is a region in which object images are displayed.

Then, when the third object image which is the selected object image is shifted by n-objet images between the first object image and the second object image, a display state of object image is shifted such that a position obtained by shifting it by a distance becomes a new position of the selected object image, wherein the distance is obtained by multiplying by "n" a value obtained by dividing the distance between the first position and the second position by a value obtained by subtracting "1" from "N"

Further, in the broadcasting receiver 100 of FIG. 1, the object images are displayed according to the object image display method of the present invention. More specifically, when the number "N" is a natural number more than "1", a first step and a second step are carried out, wherein the first step displays on the display 109 object images corresponding to objects whose the number is less than "N" among N-objects according to a previously defined display rule, and the second step shifts a display state of object images according to the display rule in response to an operation for shifting an object image selected from among the object images displayed on the display 109. The display rule is described above. The central control unit 110 holds an object image display program of the present embodiment for causing the first and second steps to be carried out.

The step S202 or S210 in FIG. 4 corresponds to the first step. The steps S206 to S210 in a case of determining that an operation for selecting an object image in the step S205 in FIG. 4 is carried out correspond to the second step.

Although the present invention is not limited to the present embodiment described above, various modifications may be made without departing from the scope of the present invention. The present invention may be adapted to any electronic device such as a video camera or a digital still camera, other than the broadcasting receiver cited as the example in the present embodiment. Also, the object image display program of the present invention may be recorded in a record medium and provided, or be downloaded in a personal computer via a network such as Internet.

REFERENCE SIGNS LIST 100 broadcasting receiver
101 tuner
102 video signal selector
103 record and playback drive unit
104 record medium
105 video signal processor
106 thumbnail generator (object image generator)
107 display control unit (controller)
107a combiner
107b on-screen-display generator (object image generator)
108 frame memory
109 display
110 central control unit (controller)
111 input determination unit
112 reception channel holding unit
113a, 113b, 113c external input terminals
114 network interface

The invention claimed is:

1. An object image display apparatus comprising:
an object image generator that generates object images corresponding to N-objects to be used to select any object from among the N-objects, wherein the number "N" is a natural number more than "1"; and
a controller that controls to display on a display object images whose the number is less than "N" among the N-object images according to a previously defined display rule,
wherein as the display rule, the controller
displays as a selected object image, at the time of selecting a first object image corresponding to a first object having the highest rank in an arrangement sequence in which the N-objects are arranged according to a certain order, the first object image on a first position in the display, and arranges and displays as non-selected object images, object images corresponding to objects having ranks below the first object by a certain number,
displays as a selected object image, at the time of selecting a second object image corresponding to a second object having the lowest rank in the arrangement sequence in which the N-objects are arranged according to a certain order, the second object image on a second position in the display, and arranges and displays as non-selected object images, object images corresponding objects having ranks above the second object by a certain number,
arranges and displays as non-selected object images, at the time of selecting a third object image corresponding to a third object which is any object arranged between the first object and the second object, one or more object images corresponding to objects having ranks below the third object image and one or more object images corresponding to objects having ranks above the third object by a certain number, on a region including an area outside the first position in the display, an area between the first position and the second position, and an area outside the second position in the display, and
controls, when the third object image which is the selected object image is shifted by n-objet images between the first object image and the second object image in a direction of the first position or the second position, such that a position obtained by shifting by a distance in the direction of the first position or the second position from the position before the shift where the third object image is displayed becomes a new position of the selected object image, wherein the distance is obtained by multiplying by "n" a value obtained by dividing the distance between the first position and the second position by a value obtained by subtracting "1" from "N", and the number "n" is a natural number equal to or more than "1".

2. The object image display apparatus according to claim 1, wherein the controller controls to display the non-selected object images so as to become reduced in size with distance from the selected object image as the display rule.

3. The object image display apparatus according to claim 1, wherein the controller controls to display the non-selected object images so as to increase a ratio of area for overlapping an adjacent object image with distance from the selected object image as the display rule.

4. An object image display method comprising:
   a first step of displaying on a display object images corresponding to objects whose the number is less than "N" among N-objects according to a previously defined display rule, wherein the number "N" is a natural number more than "1"; and
   a second step of shifting a display state of object images according to the display rule in response to an operation for shifting an object image selected from among the object images displayed on the display,
   wherein as the display rule, the first step
   displays, at the time of displaying on the display as a selected object image, a first object image corresponding to a first object having the highest rank in an arrangement sequence in which the N-objects are arranged according to a certain order, the first object image on a first position in the display, and arranges and displays as non-selected object images, object images corresponding to objects having ranks below the first object by a certain number,
   displays, at the time of displaying on the display as a selected object image, a second object image corresponding to a second object having the lowest rank in the arrangement sequence in which the N-objects are arranged according to a certain order, the second object image on a second position in the display, and arranges and displays as non-selected object images, object images corresponding to objects having ranks above the second object by a certain number, and
   arranges and displays as non-selected object images, at the time of displaying on the display as a selected object image, a third object image corresponding to a third object which is any object arranged between the first object and the second object, one or more object images corresponding to objects having ranks below the third object image and one or more object images corresponding to objects having ranks above the third object by a certain number, on a region including an area outside the first position in the display, an area between the first position and the second position, and an area outside the second position in the display, and
   as the display rule, the second step
   shifts, when the third object image which is the selected object image is shifted by n-object images between the first object image and the second object image in a direction of the first position or the second position, such that a position obtained by shifting by a distance in the direction of the first position or the second position from the position before the shift where the third object image is displayed becomes a new position of the selected object image, wherein the distance is obtained by multiplying by "n" a value obtained by dividing the distance between the first position and the second position by a value obtained by subtracting "1" from "N", and the number "n" is a natural number equal to or more than "1".

5. The object image display method according to claim 4, wherein the first step displays the non-selected object images so as to become reduced in size with distance from the selected object image as the display rule.

6. The object image display method according to claim 4, wherein the first step displays the non-selected object images so as to increase a ratio of area for overlapping an adjacent object image with distance from the selected object image as the display rule.

7. An object image display program stored on a non-transitory medium for causing a computer to execute:
   a first step of displaying on a display object images corresponding to objects whose the number is less than "N" among N-objects according to a previously defined display rule, wherein the number "N" is a natural number more than "1"; and
   a second step of shifting a display state of object images according to the display rule in response to an operation for shifting an object image selected from among the object images displayed on the display,
   wherein as the display rule, the first step
   displays, at the time of displaying on the display as a selected object image, a first object image corresponding to a first object having the highest rank in an arrangement sequence in which the N-objects are arranged according to a certain order, the first object image on a first position in the display, and arranges and displays as non-selected object images, object images corresponding to objects having ranks below the first object by a certain number,
   displays, at the time of displaying on the display as a selected object image, a second object image corresponding to a second object having the lowest rank in the arrangement sequence in which the N-objects are arranged according to a certain order, the second object image on a second position in the display, and arranges and displays as non-selected object images, object images corresponding to objects having ranks above the second object by a certain number, and
   arranges and displays as non-selected object images, at the time of displaying on the display as a selected object image, a third object image corresponding to a third object which is any object arranged between the first object and the second object, one or more object images corresponding to objects having ranks below the third object image and one or more object images corresponding to objects having ranks above the third object by a certain number, on a region including an area outside the first position in the display, an area between the first position and the second position, and an area outside the second position in the display, and
   as the display rule, the second step
   shifts, when the third object image which is the selected object image is shifted by n-objet images between the first object image and the second object image in a direction of the first position or the second position, such that a position obtained by shifting by a distance in the direction of the first position or the second position from the position before the shift where the third object image is displayed becomes a new position of the selected object image, wherein the distance is obtained by multiplying by "n" a value obtained by dividing the distance between the first position and the second position by a value obtained by subtracting "1" from "N", and the number "n" is a natural number equal to or more than "1".

8. The object image display program according to claim 7, wherein the first step displays the non-selected object images so as to become reduced in size with distance from the selected object image as the display rule.

9. The object image display program according to claim 7, wherein the first step displays the non-selected object images so as to increase a ratio of area for overlapping an adjacent object image with distance from the selected object image as the display rule.

* * * * *